United States Patent [19]

Chen

[11] Patent Number: 4,774,982

[45] Date of Patent: Oct. 4, 1988

[54] TAP WATER TEMPERATURE ADJUSTING DEVICE

[76] Inventor: Teng C. Chen, No. 9, Lane 114, Ta Hsing St., Tainan City, Taiwan

[21] Appl. No.: 130,296

[22] Filed: Dec. 8, 1987

[51] Int. Cl.⁴ .............................................. F16K 11/06
[52] U.S. Cl. ................................ 137/607; 137/625.41
[58] Field of Search ................ 137/625.41, 603, 607, 137/556.6

[56] References Cited

U.S. PATENT DOCUMENTS

| | | | |
|---|---|---|---|
| 1,527,927 | 2/1925 | Schroder | 137/625.41 X |
| 3,809,109 | 5/1974 | Breiling et al. | 137/607 X |
| 3,987,819 | 10/1976 | Schuermann | 137/625.41 X |

FOREIGN PATENT DOCUMENTS 2947228  6/1981  Fed. Rep. of Germany ................ 137/625.41

Primary Examiner—Martin P. Schwadron
Assistant Examiner—Stephen M. Hepperle
Attorney, Agent, or Firm—Bacon & Thomas

[57] ABSTRACT

A device which can provide tap water at some specified temperature simply by turning on a hot water knob and a cold water knob. By turning a calibration dial, a control pin can be turned accordingly by which the degree of alignment of a pair of control holes with respect to a pair of spiral grooves is adjusted and a specified temperature of water is obtained. Therefore, once the calibration dial is set, a certain temperature of water can be obtained every time by simply turning on the water knobs and without having to readjust the knobs several times before reaching some desired temperature of water.

2 Claims, 5 Drawing Sheets

TAP WATER TEMPERATURE ADJUSTING DEVICE

BACKGROUND OF THE INVENTION

The present invention relates to a tap water temperature adjusting device, and more particularly, to a tap water temperature adjusting device which can provide tap water at a steady temperature simply by turning on a hot water knob and a cold water knob.

Known devices for controlling tap water temperature are usually operated by adjusting a valve in a hot water knob and a valve in a cold water knob so that hot water and cold water can be mixed in a certain proportion to get a desired temperature of water.

However, the prior art tap water temperature adjusting device has a major drawback that it is necessary to adjust the hot water knob and cold water knob several times before a desired temperature of water can be obtained.

SUMMARY OF THE INVENTION

Accordingly, the object of the present invention is to overcome the aforesaid problem encountered in the prior art tap water temperature adjusting device.

The present invention provides a tap water temperature adjusting device which can provide tap water at a steady temperature simply by turning on a hot water knob and a cold water knob.

Further objects and advantages of this invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
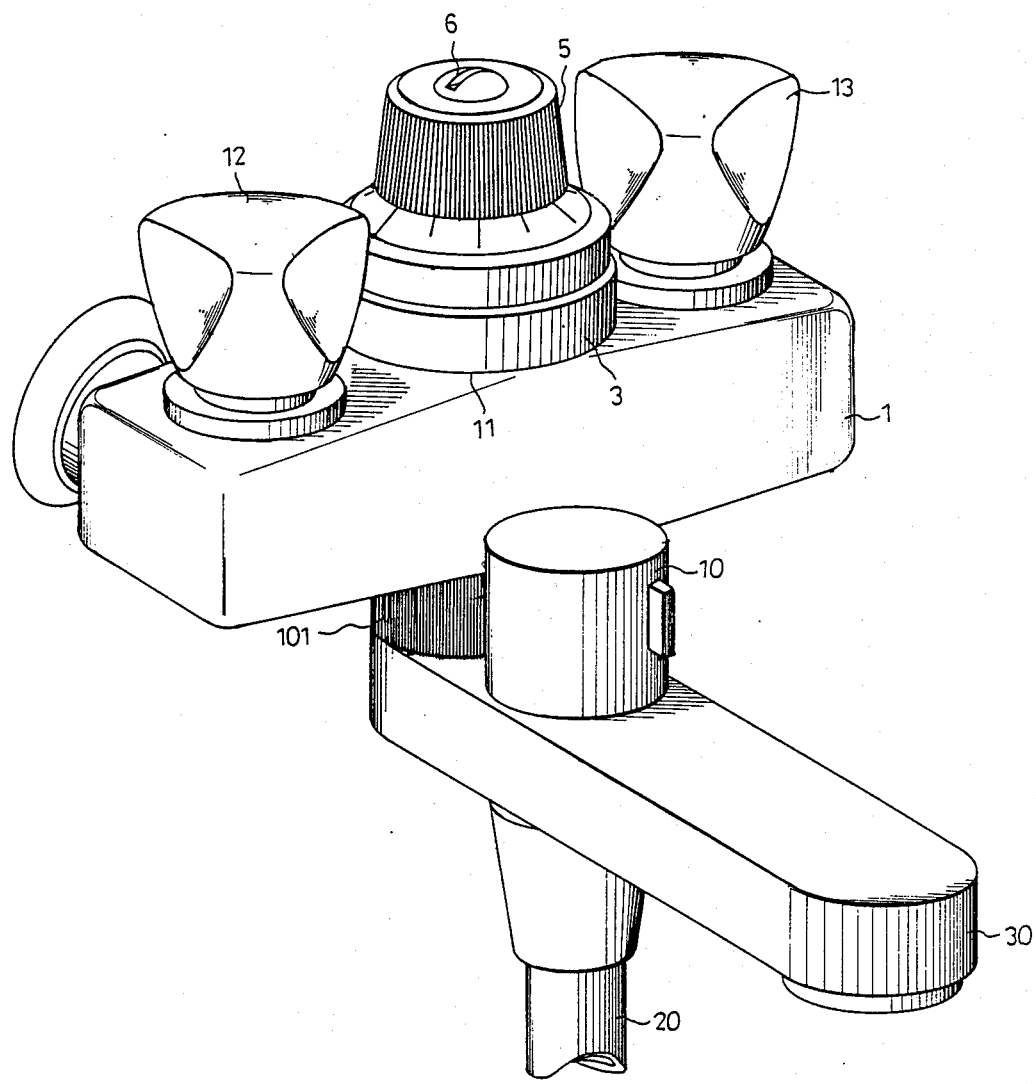
FIG. 1 is a perspective view of a tap water temperature adjusting device according to the present invention.
Figure 2:
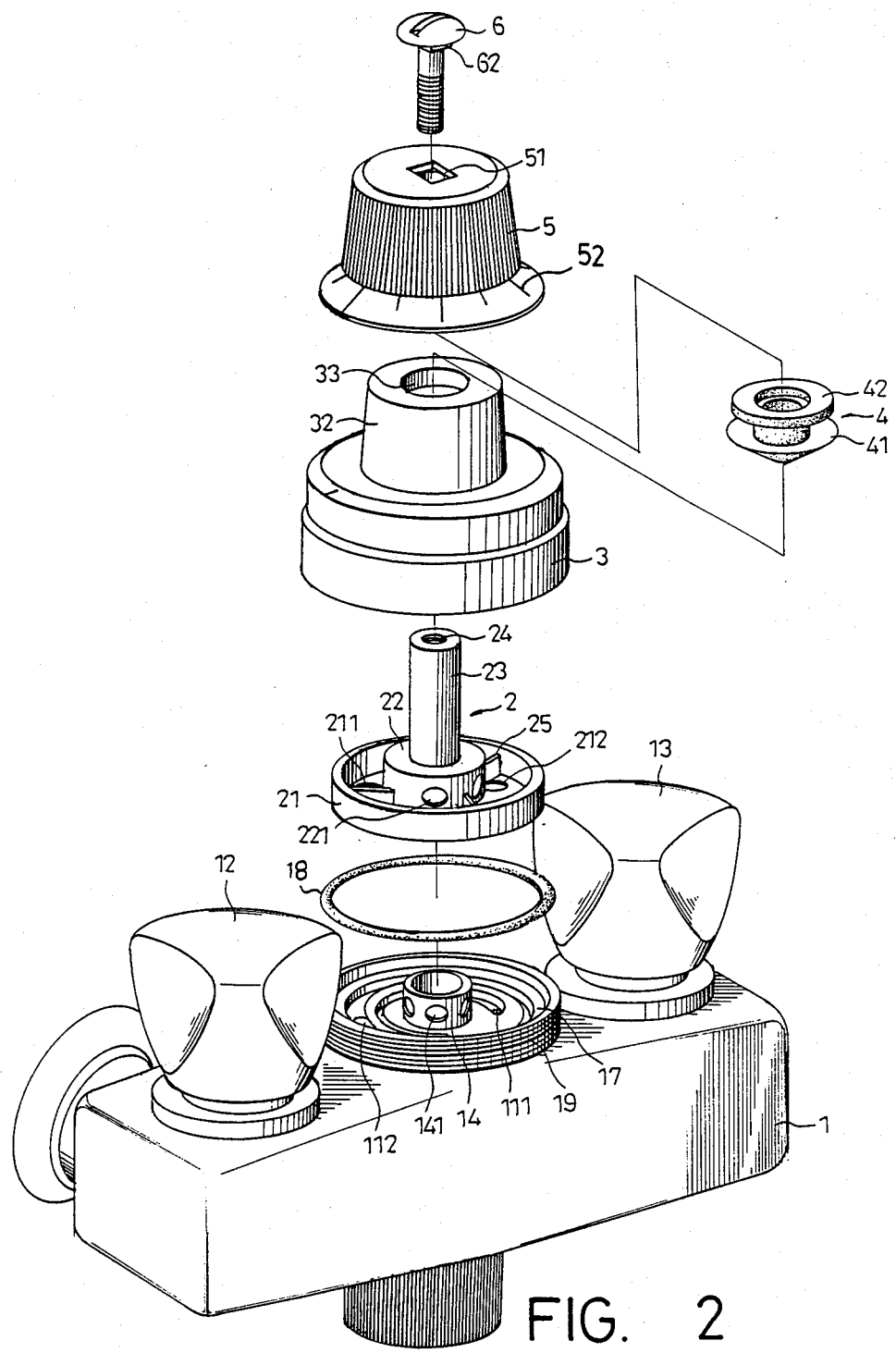
FIG. 2 is an exploded view of a tap water temperature adjusting device according to the present invention.

Referring to FIGS. 1 and 2, it can be seen that in the central portion of a body member 1, a receptacle 11 is disposed, which is controlled by a control pin 2. The control pin is located above the receptacle 11. An enclosure 3 encloses the control pin 2, and is seated atop the receptacle 11. At the top of the enclosure 3 is seated a calibration dial 5. An adjusting pin 6 threads through the center of the calibration dial 5. At the bottom of the body member 1 there is a tube 101 which is located proximate to a switching member 10 which can control the water to flow to a nozzle 30 or an exit 20.

Figure 3:
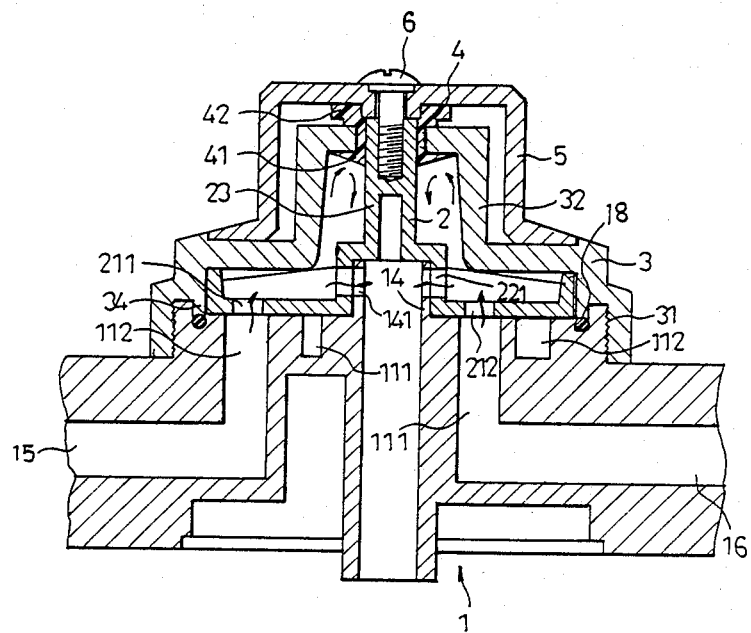
FIG. 3 is a cross-sectional view of a tap water temperature adjusting device according to the present invention.

Referring now to FIGS. 2 and 3, inside the body member 1 there are disposed a cold water channel 15 and a hot water channel 16, which are controlled by the cold water knob 12 and the hot water knob 13, respectively. The receptacle 11, disposed at the central portion of the body member 1, is a little higher than the body member 1 and is arranged with screw threads 19 at the outer periphery thereof. There is an annular member 17 within the receptacle 11. Inside the receptacle 11, an inner spiral groove 111 and an outer spiral groove 112 have a constant depth but the widths of the same gradually decrease from a wide end to a narrow end with the wide ends respectively connected to the cold water channel 15 and hot water channel 16. Between the wide and narrow ends of the inner and outer grooves (111, 112), are respective water-blocking portions (113, 114). A cylinder 14 is located at the center of the receptacle 11, with a plurality of round holes 141 therein. An annular ring 18 is mounted on the annular member 17 of the receptacle 11.

At the bottom of the control pin 2, a tray 21 is attached which has two control holes 211 and 212, one of which is proximate to the outer circumference of the tray 21, and the other of which is proximate to the inner circumference of the tray 21. The control holes 211, 212 are radially in alignment with and accessible to the inner spiral grove 111 and outer spiral groove 112, respectively, whereby different proportions of cold water and hot water can be mixed in the tray 21. A hollow protrusion 22 is seated at the center of the tray 21. Around the protrusion 22 are several ribs 25 which are arranged to enhance the strength of the tray 21. At the periphery of the protrusion 22, a plurality of holes 221 which have access to the round holes 141 are disposed, thereby enabling the water gathered in the tray 21 to flow through the round holes 141 and exit eventually. Atop the protrusion 22, a cylinder 23 is installed, said cylinder 23 having a threaded hole 24 at one end thereof.

The inner surface of the enclosure 3 has a screw thread 31 disposed therein whereby the enclosure 3 is threadably fixable on the screw thread 19 of the receptacle 11. An annular pole 34 which presses upon the annular ring 18 is also arranged inside the enclosure. A protruding member 32 is seated above the enclosure 3 with a central hole 33 at the center thereof. A waterproof rubber ring 4 is mounted on the protruding member at the central hole 33. The outer diameter of the central portion of the waterproof rubber ring 4 matches the diameter of the central hole 33. While the inner diameter of the same matches the outer diameter of the cylinder 23, the upper protrusion 42 and lower protrusion 41 prevent the control pin 2 and enclosure 3 from leaking water.

The calibration dial 5 is rotatably set at the top of the protruding member 32 and is closely attached to the upper protrusion 42 of the waterproof rubber ring 4. At the lower extension portion of the calibration dial 5, a plurality of calibrated marks indicating the temperature of water to be set. At the top of the calibration dial 5, a square hole 51 is provided through which the adjusting pin 6 is threaded. A protrusion 62 on the adjusting pin 6 engages with and is received by the square hole 51. The end of the adjusting pin 6 is threadably fixed to the control pin 2 at threaded hole 24 so that when the calibration dial 5 is turned, the control pin 2 is urged to turn accordingly.

Figure 4:
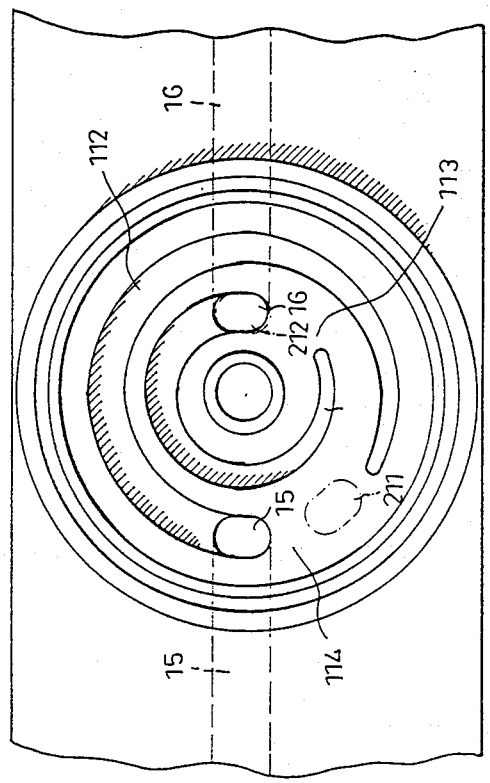
FIG. 4 is a top view of a receptacle according to the present invention.
Figure 5:
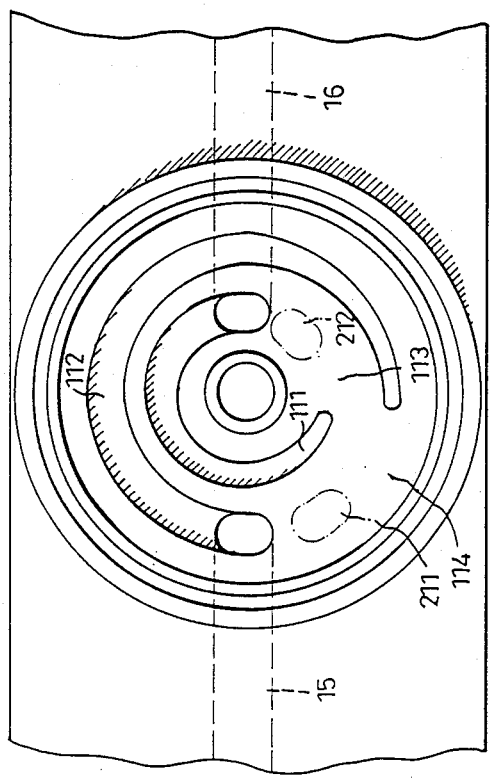
FIG. 5 is a top view of a receptacle according to the present invention at another situation.

Referring to FIGS. 4 and 5 in addition to FIGS. 2 and 3, it can be seen that to use the present invention the cold water knob 12 and hot water knob 13 are first turned on, then cold water and hot water will flow into inner spiral groove 111 and outer spiral groove 112 via the cold water channel 15 and hot water channel 16, respectively. When the calibration dial 5 is turned, the control pin 2 is urged to turn, thereby changing the degree of alignment of the control holes 211 and 212 with respect to the inner and outer spiral grooves 111, 112. When control hole 212 is in alignment with the widest end of the inner spiral groove and control hole 211 is positioned directly below at a waterblocking portion 114 of the receptacle 11, as shown in FIG. 4, hot water is supplied at maximum flow rate and no cold water is supplied, the temperature of the water is the highest accordingly. When the calibration dial 5 is turned counterclockwise, cold water is supplied along with hot water to be mixed to reach a certain water temperature.

As can be seen, once the calibration dial 5 is set, a certain temperature of water can be obtained every time by simply turning on the cold water knob and hot water knob and not having to readjust the cold and hot water knobs several times before reaching a certain water temperature, as in the prior art.

Furthermore, respective control holes 211 and 212 can be both positioned so that water-blocking portions 113 and 114 close the water supply off completely.

I claim:

1. A tap water temperature adjusting device comprising a body member (1) having a cold water channel (15) and a hot water channel (16) disposed therein, said hot and cold water channels (15, 16) being controlled by a cold and hot water knobs (12, 13), respectively, wherein the improvement comprises:

a receptacle (11) disposed at a central portion of said body member (1), an inner spiral groove (111) and an outer spiral groove 112 being disposed inside said receptacle (11) with respective water-blocking portions (113, 114) proximate thereto; respective depths of said inner and outer spiral grooves (111, 112) being constant therealong; respective widths of said inner and outer spiral grooves (111, 112) decreasing from respective wide ends thereof to narrow ends thereof; a cylinder (14) being located at a center of said receptacle (11) with a plurality of round holes (141) set therein;

a control pin (2) being located above said receptacle (11), a tray (21) being attached at a bottom of said control pin (2); said tray (21) having two control holes (211, 212) at a bottom end thereof; said control holes (211, 212) respectively being radially in alignment with and accessible to said inner and outer spiral grooves (111, 112) respectively such that different proportions of cold water and hot water are mixable in said tray (21); a hollow protrusion (22) being seated at a center of said tray (21), a plurality of holes (221) being set in said hollow protrusion (22);

said control pin (2) being enclosed by an enclosure (3) which is fixable at said receptacle (11), a protruding member (32) being seated above said enclosure (3) with a central hole (33) at a center thereof, a waterproof rubber ring (4) being mounted on said protruding member (32) at said central hole (33);

a calibration dial (5) being rotatably set at a top of said protruding member (32), a square hole (51) being provided at a top of said calibration dial (5); said square hole (51) receiving a protrusion (62) of an adjusting pin (6); one end of said adjusting pin (6) being threadably fixed to said control pin (2) so as to urge said control pin (2) when said calibration dial (5) is turned; said control pin (2) changing a degree of alignment of control holes (211, 212) at a bottom of said tray (21) with respect to said inner and outer spiral grooves (111), respectively.

2. The tap water temperature adjusting device of claim 1, wherein said control hole (211, 212) are positionable at said water-blocking portions (113, 114), respectively.

* * * * *